United States Patent [19]

McMillen et al.

[11] Patent Number: 4,882,116
[45] Date of Patent: Nov. 21, 1989

[54] METHOD OF MOLDING A LABEL ON AN ELECTRICAL CORD

[75] Inventors: Ronald R. McMillen, Minneapolis; John J. Anderley, Anoka, both of Minn.

[73] Assignee: Wagner Spray Tech Corporation, Minneapolis, Minn.

[21] Appl. No.: 188,442

[22] Filed: Apr. 29, 1988

[51] Int. Cl.⁴ .............................................. B29C 45/14
[52] U.S. Cl. .................................... 264/254; 174/112; 249/103; 264/132; 264/275; 439/491
[58] Field of Search ............... 264/254, 275, 247, 132; 249/103, 104; 40/316; 439/488, 491; 174/112

[56] References Cited

U.S. PATENT DOCUMENTS

| | | | |
|---|---|---|---|
| 2,001,491 | 5/1935 | Hendley | 174/112 |
| 3,044,127 | 7/1962 | Alden | 264/275 |
| 3,088,237 | 5/1963 | Plummer | 174/112 |
| 3,259,680 | 7/1966 | Schelke | 264/275 |
| 3,551,542 | 12/1970 | Perrone | 174/112 |
| 3,883,109 | 5/1975 | Hahns | 249/103 |
| 4,395,375 | 7/1983 | Ferris | 264/40.1 |
| 4,656,767 | 4/1987 | Tarrant | 174/112 |

Primary Examiner—James Lowe
Attorney, Agent, or Firm—Hill, Van Santen, Steadman & Simpson

[57] ABSTRACT

It has become necessary to provide warning tags and labels on equipment such as point sprayers to protect the operators so that they will not be injured and to protect the manufacturer so that it will not be sued for product liability. Often such warning labels and tags have been attached to the packages or cartons in which the apparatus is shipped and they can become separated from the equipment so that a user does not see the warning. The present invention provides an integrally molded-in place warning label which is attached to an electric cord of an appliance, such as a paint sprayer which is molded to the electrical power cord and which can be molded to the cord at the same time that a stress release and a power connector plug are molded to the cord. The warning label may be made of the same material as a strain release device and may be made of a tough resilient material so that it cannot be torn or separated from the power cord once it has been molded. The mold may be provided with dropin type face which prints such that during molding the warning is formed on the warning label in a three-dimensional form so that it will be readily available each time the tool or machine is to be used.

4 Claims, 2 Drawing Sheets

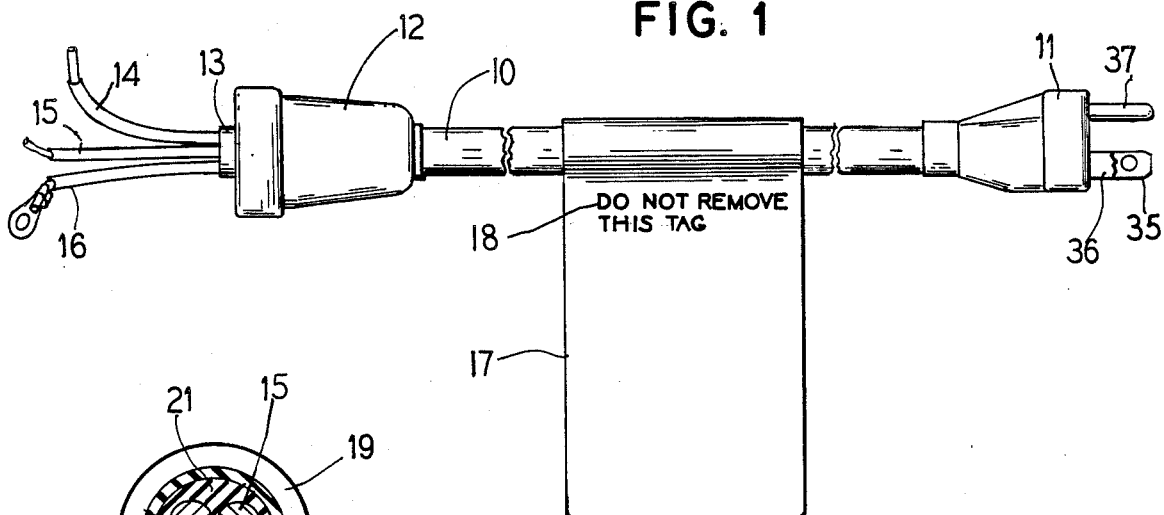
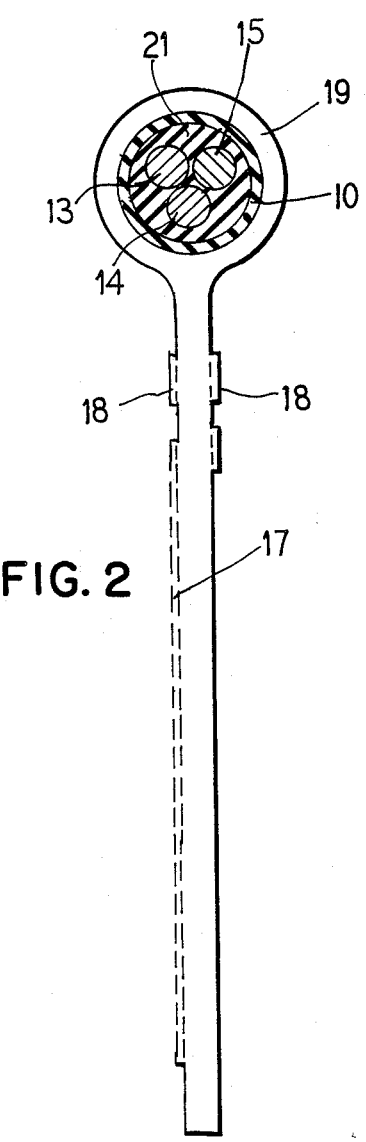
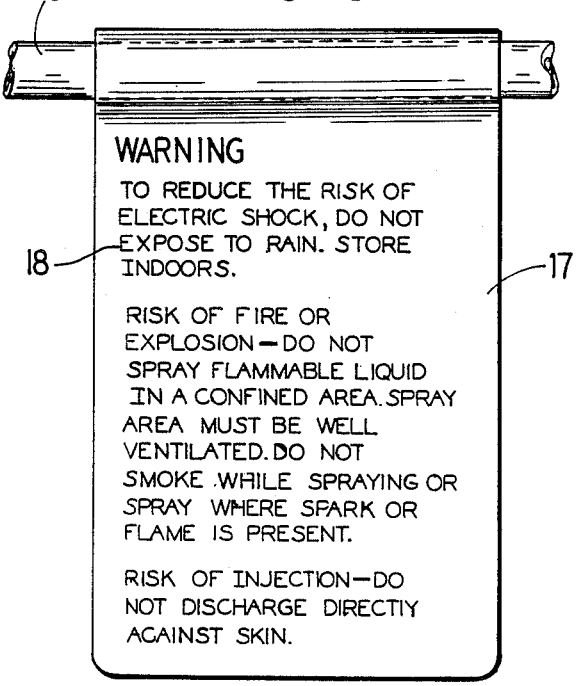

METHOD OF MOLDING A LABEL ON AN ELECTRICAL CORD

BACKGROUND OF THE INVENTION

1. Field of the Invention

This invention relates in general to apparatus and method for providing a warning label for electrical appliances such as paint spraying equipment and in particular, to a novel molded in place warning label which is attached to an electrical cord.

2. Description of the Prior Art

It is necessary to provide warning labels to customers and users of handtools such as paint spraying equipment and it has been customary in the past to provide such warnings on inserts contained in the packages or cartons in which the tools are sold and shipped or by printing the warning directly on the cartons and packages. Sometimes labels or tags are tied or otherwise attached to the tools. However, such tags can be relatively easily removed in use.

SUMMARY OF THE INVENTION

It is an object of the present invention to provide a warning tag which is molded in place to the electrical cord of an electrical tool such as a paint sprayer such that it is integrally formed with the cord and cannot be easily removed. The warning label may be molded to the electrical cord at the same time that stress releases, connectors and/or electrical plugs are molded to the cord and may be of the same material of the cord and/or the stress release. The warning label is made of relatively thick plastic material and has the warning imprinted on it. The warning may be in three-dimensional letters so that it cannot be obliterated from the label during usage of the tool so that the tool retains a warning label for the life of the tool.

It is an object of the invention to provide a permanent warning label that can be molded in place on an electrical cord of electrical tools such that it will provide a warning to users and operators of the tool for the life of the tool.

It is an object of the present invention to provide a warning tag which meets the requirements of various industry standards such as the Underwriters Laboratories requirements for electrical appliances. For example, motor operated air compressors, vacuum pumps and painting equipment require that a cautionary marking intended to instruct the operator shall be legible from the position normally assumed by the operator when starting the product. Also, markings for servicing or making settings and adjustments must be legible and visible when such work is being accomplished. Tags for cautionary markings must be die stamped or molded in raised letters or similar type not likely to become unreadable when coated with several layers of paint. It is an object of the present invention to provide an improved tag and manner of making it which complies with the safety standards established by various industry groups.

Other objects, features and advantages of the invention will readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a side plan view of the molded in place warning label of the present invention attached to an electric cord;

FIG. 2 is a sectional view through the cord illustrating in side plan view the warning label of the invention;

FIG. 3 is an enlarged plan view of the warning label of the invention; and

DESCRIPTION OF THE PREFERRED EMBODIMENTS

Figure 4:
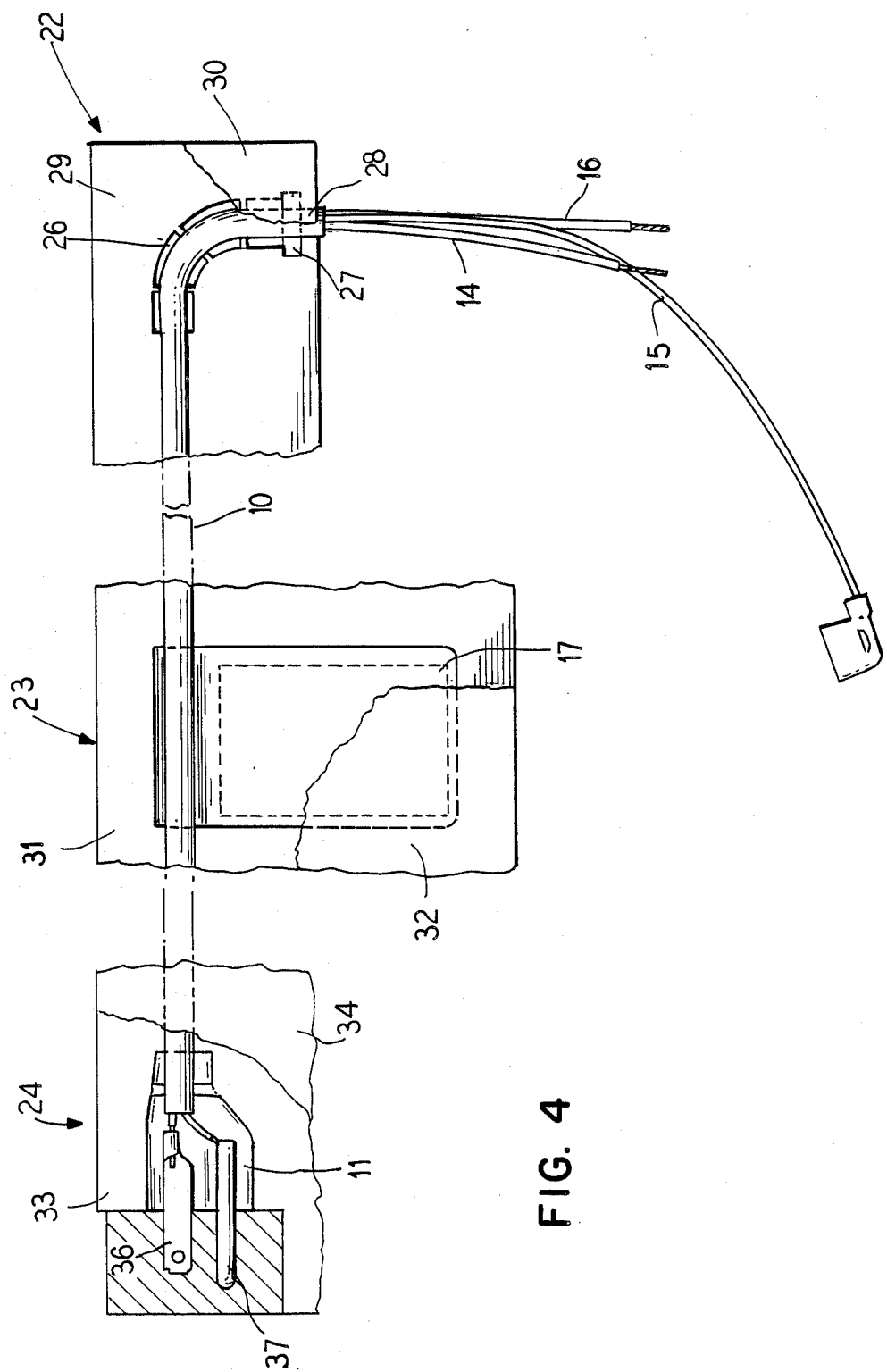
FIG. 4 illustrates the method of molding in place the warning label to an electric cord.

FIG. 1 illustrates an electrical cord 10 which has a male power plug 11 connected to one end thereof and a stress release mounting member 12 attached to the cord 10 at the other end. The cord 10 extends through a projection 13 of the strain release member 12 and individual conductors 14, 15 and 16 are carried by the cord 10. A molded-in place label 17 according to the invention is permanently attached to the power cord 10 between the plug 11 and the stress release member 12 and carries raised letters 18 as illustrated in FIGS. 1, 2 and 3. As shown in FIG. 2, the label 17 has a substantial thickness and raised letters 18 may be imprinted on both sides of the label as shown. The label 17 has a cylindrical-shaped portion 19 which extends around the outer surface of the cable 10 as shown in FIG. 2. The conductors 13, 14 and 15 are mounted in suitable insulation 21 within the conductor 10 and are electrically insulated from each other.

FIG. 4 illustrates the method of forming the label 17 and illustrates three molds for molding a strain release, a label and a plug to a power cord 10. The mold 22 forms a strain release 26 about the cord 10 which has a slightly different form than the strain release 12 shown in FIG. 1 in that the strain release 26 has a 90° bend formed in it and has a collar 27 and an extension 28. The mold 22 is formed of two pieces 29 and 30 which open to allow the electrical cord 10 to pass therethrough and after it is closed, suitable plastic is injected into the mold so as to form the strain release 26. The mold 23 is formed of two pieces 31 and 32 which are opened relative to each other so that the cord can pass therethrough and then the mold is closed and suitable plastic is injected into the mold so as to form the label 17. The mold portions 31 and 32 contain three dimensional type so that the suitable warning markings 18 will be imprinted on the label 17 as it is molded. The mold 24 is formed of two portions 33 and 34 and the cord 10 is placed in the open mold portions 33 and 34 with the conductors 14, 15 and 16 connected to metal contact plugs 35, 36 and 37 after which the mold is closed and suitable plastic is injected in the mold so as to form the plug 11.

The molds 22, 23 and 24 may be provided with positioning pins so as to hold the cord 10 centered in the mold during the molding process such that the label 17, the plug 11 and the strain release 26 will be centered on the electrical cord 10.

The label 17 may be made of the same material as the strain releases 12 or 26. This may be the same material as the outer insulation coating of the cord 10.

The resulting power cord is provided with an integrally molded plug and strain release as well as the warning label 17 which becomes a permanent part of the power cord for the life of the power tool such as a paint sprayer. Since the label 17 is imprinted with three dimensional letters 18, the warning will be permanently affixed to the tool to continuously provide a suitable warning to operators of the equipment. Since the plastic material from which the label is made is tough and resilient it cannot be removed since it is permanently bonded to the outer insulation covering of the electrical cord 10.

It is seen that this invention provides a new and novel warning label for an electrical appliance such as a paint sprayer and a method for making the same and although it has been described with respect to preferred embodiments, it is not to be so limited as changes and modifications can be made which are within the full intended scope as defined by the appended claims.

We claim:

1. The method of forming a molded-in-place label on an electrical cord by molding comprising the steps of, disposing a portion of the electrical cord in a mold formed of two pieces formed with three dimensional type, injecting a suitable plastic into said mold to form a label with three dimensional type which is bonded to said cord and removing said cord and molded in place label from said mold.

2. The method of claim 1 including the step of molding a strain release to said electrical cord.

3. The method of claim 1 including the step of molding an electrical power plug to said cord.

4. The method of claim 1 including forming a flexible cover on said electrical cord.

* * * * *